（12）United States Patent
Dhuse et al.

(10) Patent No.: US 11,513,700 B2
(45) Date of Patent: Nov. 29, 2022

(54) SPLIT-N AND COMPOSABLE SPLITS IN A DISPERSED LOCKLESS CONCURRENT INDEX

(71) Applicant: International Business Machines Corporation, Armonk, NY (US)

(72) Inventors: Greg R. Dhuse, Chicago, IL (US); Kevin M. Freese, Wichita, KS (US); Thomas Dubucq, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 16/291,329

(22) Filed: Mar. 4, 2019

(65) Prior Publication Data

US 2020/0285404 A1 Sep. 10, 2020

(51) Int. Cl.
*G06F 3/06* (2006.01)
*G06F 11/10* (2006.01)

(52) U.S. Cl.
CPC .......... *G06F 3/0631* (2013.01); *G06F 3/0604* (2013.01); *G06F 3/067* (2013.01); *G06F 3/0659* (2013.01); *G06F 11/1076* (2013.01)

(58) Field of Classification Search
CPC ...... G06F 3/0631; G06F 3/067; G06F 3/0659; G06F 11/1076; G06F 3/0604
See application file for complete search history.

(56) References Cited

U.S. PATENT DOCUMENTS

| 8,930,375 | B2 | 1/2015 | Dhuse et al. |
| 8,935,256 | B2 | 1/2015 | Dhuse et al. |
| 10,013,444 | B2 | 7/2018 | Dhuse et al. |
| 2016/0330180 | A1* | 11/2016 | Egorov .................. G06F 21/14 |
| 2017/0123669 | A1 | 5/2017 | Resch et al. |
| 2017/0193023 | A1* | 7/2017 | Dhuse .................. G06F 3/0653 |
| 2017/0272209 | A1* | 9/2017 | Yanovsky ............. H04L 9/0863 |
| 2018/0260427 | A1 | 9/2018 | Khadiwala |

OTHER PUBLICATIONS

Anonymous; Distributed transactional conversation system utilizing interprocess network communication; ip.com; IP.com No. IPCOM000238234D; Aug. 12, 2014; 5 pgs.

(Continued)

*Primary Examiner* — Amresh Singh
(74) *Attorney, Agent, or Firm* — Randy Emilio Tajeda; Andrew D. Wright; Calderon Safran & Cole, P.C.

(57) ABSTRACT

A method for execution by one or more processing modules of one or more computing devices of a dispersed storage network (DSN). The method includes performing multiple splits in a single operation with a dispersed lockless concurrent index (DLCI) backed by a distributed transaction protocol by determining how many nodes n are required to hold data object entries, adding the n nodes to a distributed transaction, and when a parent node does not require a cascading split, adding it to the distributed transaction, and when the parent node needs to be split, recursively applying the determining and adding steps to the parent node until reaching a node that does not need to be split or is a root node of the DLCI.

17 Claims, 6 Drawing Sheets

(56) References Cited

OTHER PUBLICATIONS

Anonymous; Method and System for a Scalable Hierarchical Concurrent Update Tree with an Optimized Response Time for Processing Transactions; ip.com; IP.COM No. IPCOM000249452D; Feb. 27, 2017; 3 pgs.

Anonymous; Rebuilding Intra-Transactional Data; ip.com; IP.com No. IPCOM000247235D; Aug. 17, 2016; 3 pgs.

Anonymous; System and Method for propagating quality of service in a distributed transaction environment; ip.com; IP.com No. IPCOM000243770D; Oct. 16, 2015; 10 pgs.

Roy; Data Intensive Computing Systems; Lecture 18; NoSQL and Column Store; CompSci 516: Data Intensive Computing Systems; Fall 2016; p. 1-77; Duke CS.

* cited by examiner

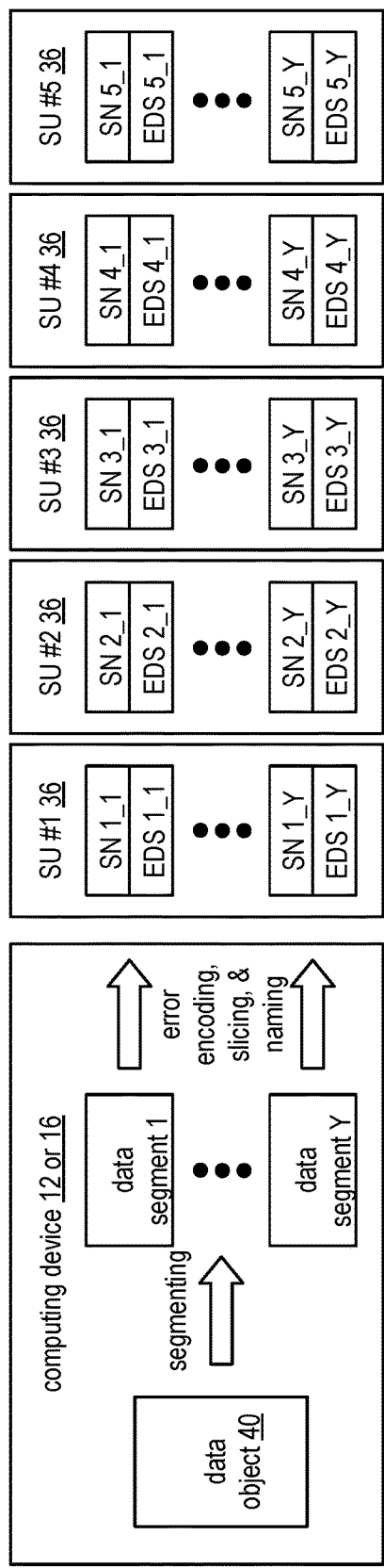

SPLIT-N AND COMPOSABLE SPLITS IN A DISPERSED LOCKLESS CONCURRENT INDEX

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
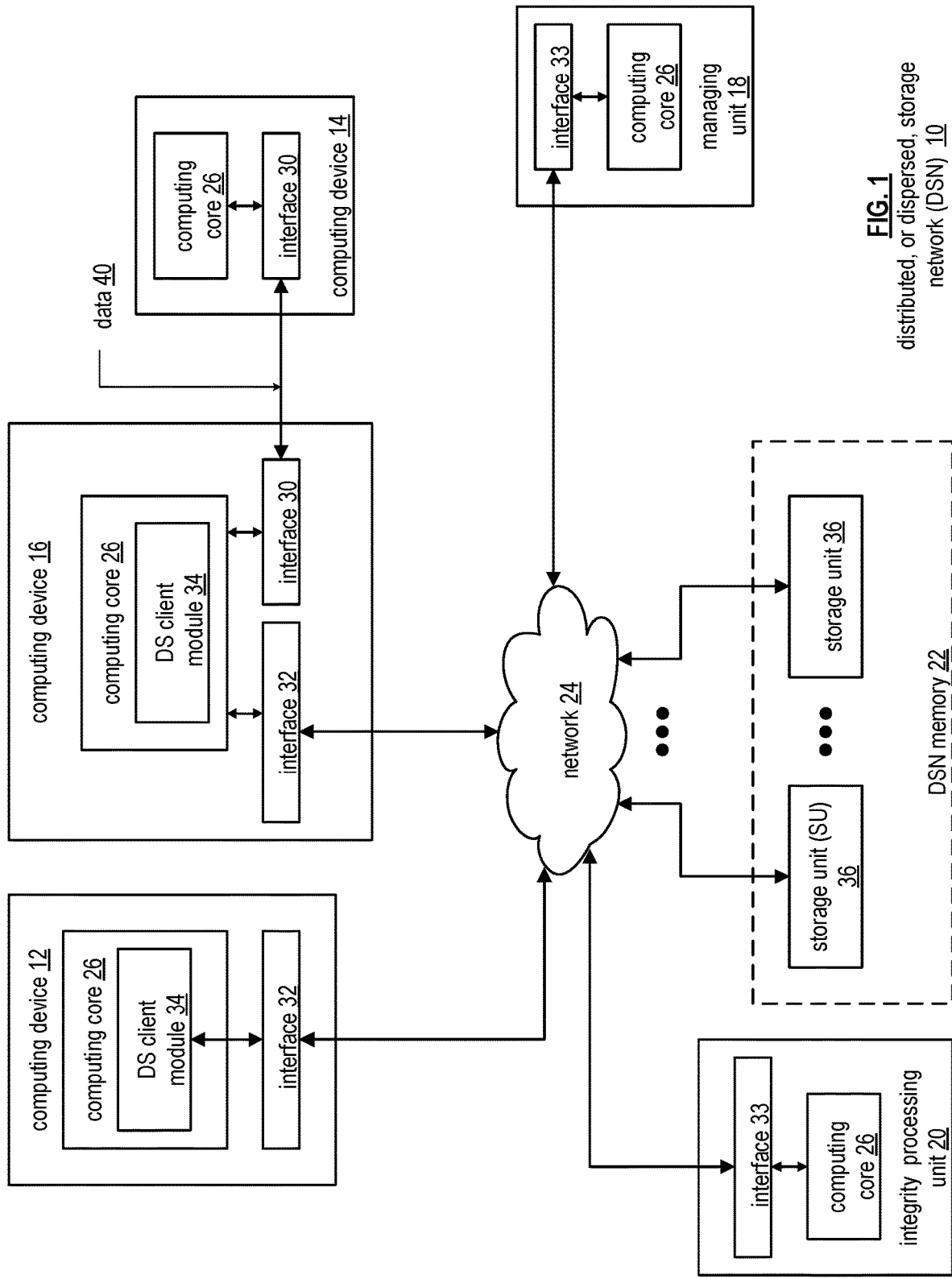
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
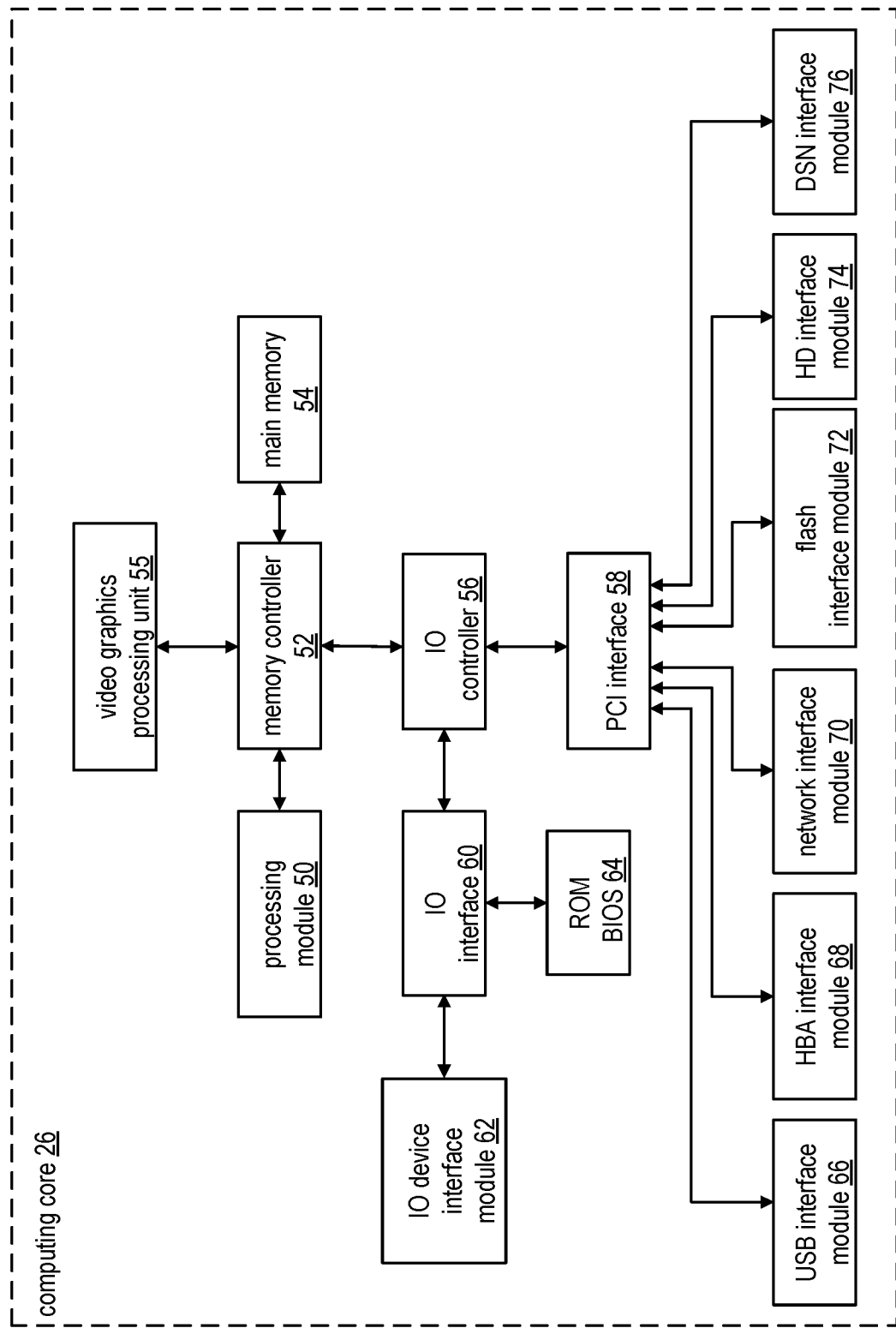
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-9A. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
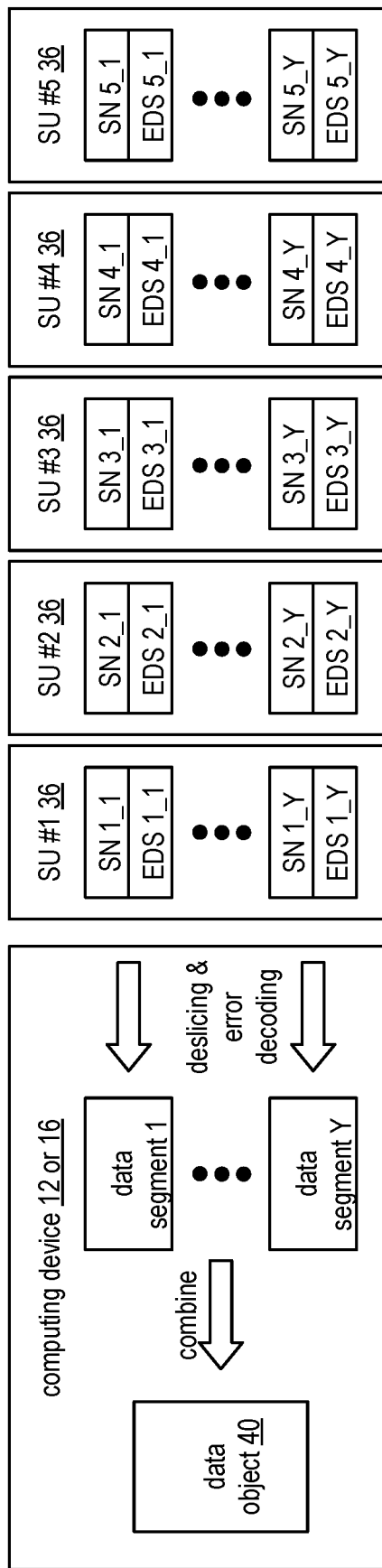
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In one embodiment, a dispersed lockless concurrent index (DLCI), on top of a DSN memory, provides an efficient mechanism to store and search for data. In search trees (e.g., B-trees), internal (non-leaf) nodes can have a variable number of child nodes within some pre-defined range. When data is inserted or removed from a node, its number of child nodes changes. In order to maintain the pre-defined range, internal nodes may be joined or split. The lower and upper bounds on the number of child nodes are typically fixed for a particular implementation. For example, in a 2-3 B-tree (often simply referred to as a 2-3 tree), each internal node may have only 2 or 3 child nodes.

For a DLCI, two situations can lead to cascading splits. Either a split at one level will trigger a split at the level above it or, due to a split size parameter reduction, a node requires multiple splits in order to be under a split threshold. The split threshold reflects a maximum number of child nodes per root parent node of the index. The threshold can be based on any of: number of entries, node size (aggregated entries), data size limitations, data object limitations, particular data attributes, categorical data, data duplication, or data classification, etc. For example, assuming a split threshold of X, a parent node would require multiple splits for any operation requiring at least X+1 additional child nodes. More particularly, for a split threshold of 6, a node would be split multiple times if it requires 7 or more nodes or exceeds a total node size capacity of 6 nodes. A parent node would then be subdivided into child nodes such that each contains fewer than 6 values. The split threshold can be any value in practice (e.g., 2, 3, 5, 6, etc.). Usually, in these situations, separate split operations are required, one per node to split, in order to balance the DLCI.

Figure 9:
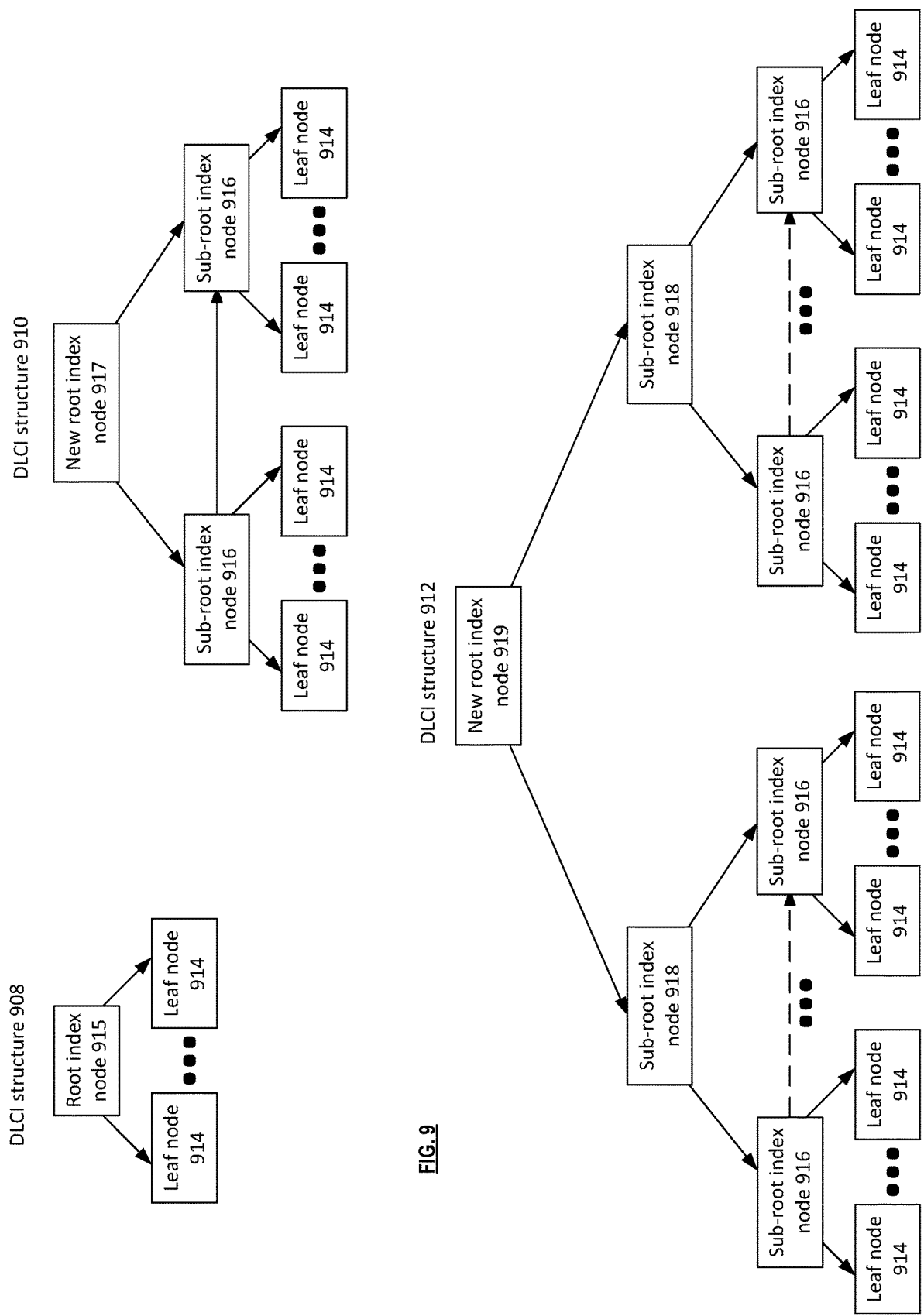
FIG. 9 is a schematic block diagram of a generic example of node splitting in accordance with the present invention.

FIG. 9 is a diagram illustrating an example of expanding an index and includes index structures 908, 910, and 912. The expanding example starts with the index structure 908, transitions through the index structure 910, and concludes with index structure 912. Index structure 908 includes a root index node 915 and a plurality of leaf nodes 914. Index structure 910 includes a new root index node 917, at least two sub-root index node 916, and another plurality of leaf nodes 914. Index structure 912 includes another new root index node 919, another at least two sub-root index node 918, a plurality of sub-root index nodes 916 that includes the at least two sub-root index node 916 of index structure 910, and yet another plurality of leaf nodes 914.

From time to time more leaf nodes 914 may be added to the plurality of leaf nodes 914 of index structure 908. For example, more data objects are added to a dispersed storage network and more corresponding data object entries are added to leaf nodes 914 of the plurality of leaf node 914. A determination is made whether to expand the index structure 908 as the index structure 908 grows (e.g., horizontally). For example, the determination is made to expand the index structure 908 when the plurality of leaf nodes 914 includes too many leaf nodes 914 (above a split threshold). When the determination is made to expand the index structure 908, the two or more sub-root index nodes 916 are created to include entries associated with the new plurality of leaf nodes 914. The new root index node 916 is created to include sub-root entries corresponding to the two or more sub-root index nodes 916.

From time to time more leaf nodes 914 may be added to the plurality of leaf nodes 914 of index structure 910. For example, more data objects are added to the dispersed storage network, more corresponding data object entries are added to leaf nodes 914 of the plurality of leaf node 914, and sub-root index node 916 are split to produce more than the at least two sub-root index node 916. A determination is made whether to expand the index structure 910 as the index structure 910 grows (e.g., horizontally). For example, the determination is made to expand the index structure 910 when the two or more sub-root index node 916 includes too many sub-root index node 916 (e.g., new root index node 917 includes too many entries). When the determination is made to expand the index structure 910, the two or more sub-root index nodes 918 are created to include entries associated with the sub-root index nodes 916. The new root index node 919 is created to include sub-root entries corresponding to the two or more sub-root index nodes 918. Such an expansion process may continue indefinitely.

In one embodiment, with a DLCI backed by a distributed transaction protocol (i.e., coordination of data commits), the balancing of a DLCI for split operations can be done in a single operation, by determining in advance how many nodes are required to hold the children of the node to split. For a given node needing to be split into n nodes, the n new nodes can be added to a distributed transaction. If the parent node doesn't require a cascading split, it can be added to the transaction. If the parent node needs to be split, the whole process can be recursively applied to the parent node, until reaching a node that doesn't need to split or a root node of the DLCI. Finally, the operation containing all the nodes requiring modification can be processed.

This method will reduce the amount of work performed in memory for horizontal expansion as it will prevent sequential splitting. This method will also reduce the number of roundtrips necessary since previously every triplet (i.e., parent node, left node and right node) needed their own separate transaction. Finally, if this method is used atomically with DLCI updates, it also allows the system to make a strong guarantee about node size. Outside of a rebalancing period after a change of either split or join size parameter, or if the DLCI's cardinality is less than join size, DLCI nodes are guaranteed to be bigger than join size and smaller than split size.

Figure 9A:
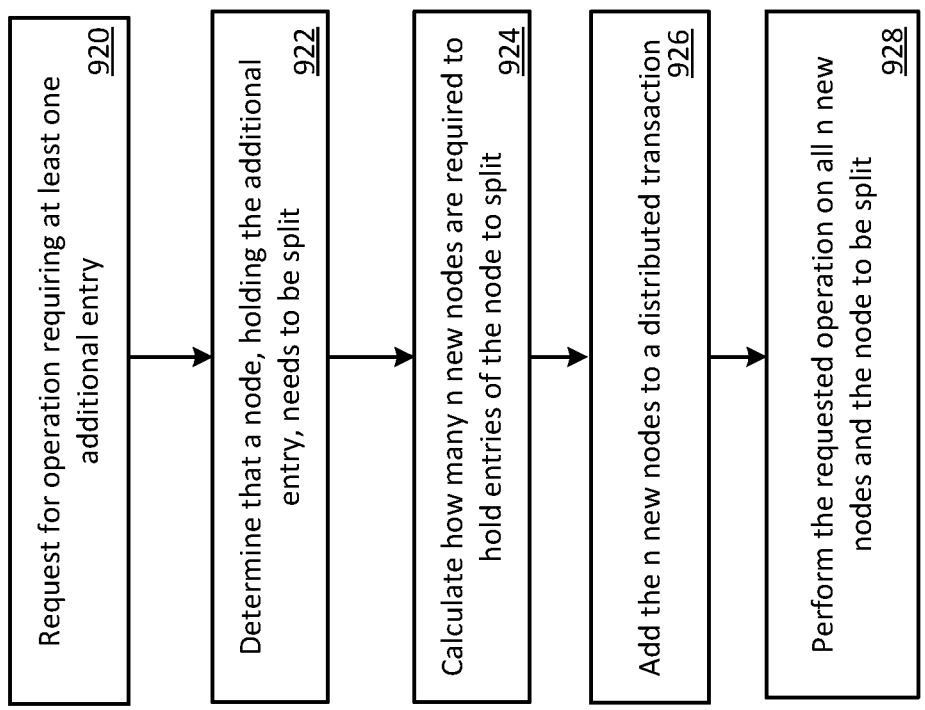
FIG. 9A is a flowchart illustrating an example of node splitting in accordance with the present invention.

FIG. 9A is a flowchart illustrating an example of node splitting in accordance with the present invention. In particular, a method is presented for use in conjunction with one or more functions and features described in conjunction with FIGS. 1-2, 3-8, and also FIG. 9.

In step 920, a request for an operation is received that requires at least one additional entry in an DLCI index. In step 922, it is determined that a node, holding the additional entry, needs to be split. For example, a node may require multiple splits in order to remain under a split threshold. The split threshold reflects a maximum number of child nodes per parent node in the index. The threshold can be based on any of: number of entries, node size (aggregated entries), data size limitations, data object limitations, particular data attributes, categorical data, data duplication, or data classification, etc. For example, assuming a split threshold of X, a parent node would require multiple splits for any operation requiring at least X+1 additional child nodes. More particularly, for a split threshold of 6, a node would be split multiple times if it requires 7 or more nodes or exceeds a total node size capacity of 6 nodes. A parent node would then be subdivided into child nodes such that each contains fewer than 6 values. The split threshold can be any value in practice (e.g., 2, 3, 5, 6, etc.).

In step 924, based on if a node needs to be split, it is calculated how many n new nodes are required to hold entries of the node to split. For example, assuming a split threshold of X, a parent node would require multiple splits for any operation requiring at least X+1 additional child nodes.

In step 926, the n new nodes are added to a distributed transaction.

In step 928, the operation (e.g., storage or replication of data) is performed on all n new nodes and the node to be split.

The process (steps 920-924) are recursively applied to the parent node until reaching a node that doesn't need to split or is the root of the DLCI. If a node doesn't require a cascading split, it can be added to the distributed transaction as in step 926.

In the past, in these situations, separate split operations were required, one per node to split, in order to balance the DLCI. This method reduces the amount of work performed in memory for horizontal expansion as it will prevent sequential splitting. This method will also reduce the number of roundtrips necessary since previously every triplet (i.e., parent node, left node and right node) needed their own separate transaction. Finally, if this method is used atomically with DLCI updates, it also allows the system to make a strong guarantee about node size. Outside of a rebalancing period after a change of either split or join size parameter, or if the DLCI's cardinality is less than join size, DLCI nodes are guaranteed to be bigger than join size and smaller than split.

The method described above in conjunction with the processing module can alternatively be performed by other modules of the dispersed storage network or by other computing devices. In addition, at least one memory section (e.g., a non-transitory computer readable storage medium)

that stores operational instructions can, when executed by one or more processing modules of one or more computing devices of the dispersed storage network (DSN), cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for performing multiple splits with a dispersed lockless concurrent index backed by a distributed transaction protocol, comprises:
   receiving a requested operation requiring at least one additional entry into the dispersed lockless concurrent index, the dispersed lockless concurrent index being placed on top of a dispersed storage network of a plurality of storage units containing a plurality of encoded data slices, the requested operation being inserting or removing data from a node of the dispersed lockless concurrent index, wherein the dispersed lockless concurrent index is used to store or search for data in the dispersed storage network,
   wherein the dispersed storage network comprises a dispersed storage memory and a dispersed storage network managing unit, the dispersed storage network managing unit is configured to store a data object in the dispersed storage memory by: dividing the data object into plural segments; producing a plurality of sets of the encoded data slices from the plural segments; and providing the plurality of sets of the encoded data slices with their respective slice names to the plurality of storage units for storage;
   determining that the node of the dispersed lockless concurrent index is to be split to perform the requested operation;
   calculating a number of new nodes required to hold entries of the node to be split;
   determining that a parent node is to be split, the parent node being a parent node to the node to be split;
   determining all node splits in the dispersed lockless concurrent index that are necessary to perform the requested operation and to also maintain a split threshold;
   adding the new nodes to a single distributed transaction; and
   performing the requested operation based on the single distributed transaction on all nodes of the dispersed lockless concurrent index that require modification as a result of the requested operation, including the new nodes and the node to be split,
   wherein the calculating, the determining that a parent node is to be split, and the determining all node splits are performed in advance of the performing the requested operation.

2. The method of claim 1 further comprises recursively applying the determining that a node is to be split, calculating and adding steps to a parent node in the single distributed transaction until reaching a node that does not need to be split or is a root node of the dispersed lockless concurrent index.

3. The method of claim 1, wherein the calculating is based on the split threshold.

4. The method of claim 3, wherein the split threshold is a maximum number of entries that are allowed to share a common node.

5. The method of claim 3, wherein the split threshold is based on any of: number of the entries, node size, data size limitations, data object limitations, data attributes, categorical data, data duplication, or classification.

6. The method of claim 3, wherein the dispersed lockless concurrent index is balanced in a single operation.

7. The method of claim 6, further comprising creating the encoded data slices using dispersed storage error encoding, wherein
the plurality of sets of the encoded data slices are generated using an encoding function, a data segmenting protocol, and per data segment encoding values,
the dispersed storage network comprises a dispersed storage client module,
the dispersed storage client module creates the encoded data slices,
the dispersed storage memory comprises the plurality of storage units, the storage units storing the encoded data slices received from the dispersed storage client module; and
the performing further comprises the dispersed lockless concurrent index being balanced such that a maximum number of child nodes per root parent node is below the split threshold.

8. The method of claim 7, wherein the per data segment encoding values include a total width, pillar width, number of encoded data slices per encoding of a data segment, a decode threshold number, a read threshold number, and a write threshold number.

9. The method of claim 1, wherein the single distributed transaction includes a distributed write data transaction to a vault of storage units within the dispersed storage network.

10. The method of claim 1, wherein the calculating is based on a determined size of the new nodes.

11. The method of claim 1, further comprising creating the encoded data slices using dispersed storage error encoding, wherein
the dispersed storage network comprises a dispersed storage client module,
the dispersed storage client module creates the encoded data slices based on a dispersed storage error encoding process with dispersed storage error encoding parameters including: an encoding function, a data segmenting protocol, and per data segment encoding values,
the dispersed storage memory comprises the plurality of storage units, the storage units storing the encoded data slices received from the dispersed storage client module,
the calculating is based on a split threshold;
the split threshold determines a maximum number of nodes that are child nodes of a root parent node, and
the additional entry is data inserted into one of the nodes of the dispersed lockless concurrent index.

12. A computing device of a group of computing devices of a dispersed storage network of a plurality of storage units containing a plurality of encoded data slices, the computing device comprises:
an interface;
a local memory;
a dispersed lockless concurrent index including one or more nodes, the dispersed lockless concurrent index being placed on top of the dispersed storage network, wherein the dispersed lockless concurrent index is used to store or search for data in the dispersed storage network,
wherein the dispersed storage network comprises a dispersed storage memory and a dispersed storage network managing unit, the dispersed storage network managing unit is configured to store a data object in the dispersed storage memory by: dividing the data object into plural segments; producing a plurality of sets of the encoded data slices from the plural segments; and providing the plurality of sets of the encoded data slices with their respective slice names to the plurality of storage units for storage; and
a processing module operably coupled to the interface and the local memory, wherein the processing module:
receives a request for an operation requiring at least one additional entry into the dispersed lockless concurrent index, the requested operation being inserting or removing data from a node of the dispersed lockless concurrent index;
determines that the node, holding the additional entry, is to be split;
calculates how many new nodes are required to hold entries of the node to be split;
determines that a parent node is to be split, the parent node being a parent node to the node to be split;
determines all node splits in the dispersed lockless concurrent index that are necessary to perform the requested operation and to also maintain a split threshold;
adds the new nodes to a single distributed transaction; and
performs the operation based on the single distributed transaction on all nodes of the dispersed lockless concurrent index that require modification as a result of the requested operation, including the new nodes and the node to be split,
wherein the calculating, the determining that a parent node is to be split, and the determining all node splits are performed in advance of the performing the operation.

13. The computing device of claim 12 further comprises recursively applying the determining that a node is to be split, calculating, and adding steps to a parent node in the single distributed transaction until reaching a node that does not need to be split or is a root node of the dispersed lockless concurrent index.

14. The computing device of claim 12, wherein the calculating is based on the split threshold.

15. The computing device of claim 14, wherein the split threshold is a maximum number of entries that are allowed to share a common node.

16. A dispersed storage network comprises:
a plurality of storage units containing a plurality of encoded data slices,
wherein the dispersed storage network comprises a dispersed storage memory and a dispersed storage network managing unit, the dispersed storage network managing unit is configured to store a data object in the dispersed storage memory by: dividing the data object into plural segments; producing a plurality of sets of the encoded data slices from the plural segments; and providing the plurality of sets of the encoded data slices with their respective slice names to the plurality of storage units for storage;
memory storing a dispersed lockless concurrent index including one or more nodes, wherein the dispersed lockless concurrent index is used to store or search for data in the dispersed storage network; and a processing module operably coupled to the memory, wherein the processing module:
receives a request for an operation requiring at least one additional entry into the dispersed lockless concurrent index, the requested operation being inserting or removing data from a node of the dispersed lockless concurrent index;
determines that a node of the dispersed lockless concurrent index is to be split to perform the requested operation;
calculates a number of new nodes required to hold entries of the node to be split;
determines that a parent node is to be split, the parent node being a parent node to the node to be split;
determines all node splits in the dispersed lockless concurrent index that are necessary to perform the requested operation and to also maintain a split threshold;
adds the new nodes to a single distributed transaction; and
performs the requested operation based on the single distributed transaction on all nodes of the dispersed lockless concurrent index that require modification as a result of the requested operation, including the new nodes and the node to be split, wherein the calculating, the determining that a parent node is to be split, and the determining all node splits are performed in advance of the performing the requested operation, and the all node splits comprises a first sub-root index that is a child to a root index, a second sub-root index that is a child to the first sub-root index, a third sub-root index that is a child to the root index, and a fourth sub-root index that is a child to the third sub-root index.

17. The dispersed storage network of claim 16 further comprises recursively applying the determining that a node is to be split and adding steps to a parent node in the single distributed transaction until reaching a node that does not need to be split or is a root node of the dispersed lockless concurrent index.

* * * * *